United States Patent [19]
Yamada

[11] Patent Number: 5,539,458
[45] Date of Patent: Jul. 23, 1996

[54] TFT-DRIVE IMAGE SENSOR CAPABLE OF PRODUCING AN OFFSET-FREE IMAGE SIGNAL

[75] Inventor: Norikazu Yamada, Kanagawa, Japan

[73] Assignee: Fuji Xerox Co., Ltd., Tokyo, Japan

[21] Appl. No.: 524,952

[22] Filed: Sep. 8, 1995

Related U.S. Application Data

[63] Continuation of Ser. No. 151,807, Nov. 15, 1993, abandoned.

[30] Foreign Application Priority Data

Nov. 16, 1992 [JP] Japan .................................. 4-328934

[51] Int. Cl.$^6$ ...................................................... H04N 9/64
[52] U.S. Cl. ............................................................ 348/243
[58] Field of Search ................................... 348/241, 243, 348/245, 248, 207; H04N 9/64

[56] References Cited

U.S. PATENT DOCUMENTS

| | | | |
|---|---|---|---|
| 4,293,877 | 10/1981 | Tsunekawa et al. | 348/248 |
| 4,484,223 | 11/1984 | Tsunekawa | 348/243 |
| 5,117,099 | 5/1992 | Schmidt | 250/208.2 |
| 5,162,912 | 11/1992 | Ueno et al. | 348/243 |
| 5,235,174 | 8/1993 | Ikeda et al. | 250/208.1 |

FOREIGN PATENT DOCUMENTS

| | | | |
|---|---|---|---|
| 58-220576 | 12/1983 | Japan | H04N 5/30 |
| 63-9358 | 1/1988 | Japan | H04N 1/028 |

*Primary Examiner*—Wendy Greening
*Assistant Examiner*—Tuan V. Ho
*Attorney, Agent, or Firm*—Finnegan, Henderson, Farabow, Garrett & Dunner

[57] ABSTRACT

A number of photodiodes are arranged in line and dark output generating diodes are associated with the respective photodiodes. The light incident side of each dark output generating diode is shielded by a metal film. Two thin-film transistors are respectively connected to the photodiode and the dark output generating diode to transfer charges generated in the respective diodes. A capacitor is connected between the sources of the two thin-film transistors, and stores charges corresponding to the difference between the charges transferred through the two thin-film transistors, i.e., charges generated in the photodiode in response to incident light. Alternatively, the charges transferred through the two thin-film transistors are respectively stored in first and second capacitors, and charges corresponding to the difference between the charges of the first and second capacitors are obtained by a differential amplifier and stored in a third capacitor.

7 Claims, 5 Drawing Sheets

TFT-DRIVE IMAGE SENSOR CAPABLE OF PRODUCING AN OFFSET-FREE IMAGE SIGNAL

This application is a continuation, of application Ser. No. 08/151,807 filed Nov. 15, 1993, now abandoned.

BACKGROUND OF THE INVENTION

The present invention relates to an image sensor used in an image input device of a facsimile machine, scanner, etc. More specifically, the invention relates to a TFT-drive-type image sensor in which linearly arranged photodetectors are divided into a plurality of blocks and thin-film transistors are connected to the respective photodetectors to read their output signals on a block-by-block basis by matrix-type driving.

In a conventional contact-type image sensor, light reflected from a document surface is input, via a rod lens array, to a long photodetector array whose length is approximately equal to a document width and an electrical signal corresponding to image information on the document is produced by photoelectric conversion from respective photodetectors constituting the photodetector array.

In a TFT-drive-type image sensor, which has been proposed as the above type of image sensor, charges generated in the respective photodetectors are transferred on a block basis by use of thin-film transistors (TFT) and a matrix wiring and temporarily stored in storage capacitors. Then, a detection circuit reads out signals in time sequence on a block basis. Thus, it is possible to read one-line image information by a single driver IC, to thereby reduce the production cost.

FIG. 6 shows an example of the TFT-drive-type image sensor which includes a photodetector array 50 in which a plurality of photodetectors P are arranged at a certain density over a length approximately equal to a document width, a thin-film transistor array 51 consisting of a plurality of thin-film transistors T that are in one-to-one correspondence with the photodetectors p, a driver IC 52 for detecting charges generated in the photodetectors P, and a wiring 53 for connecting the thin-film transistors T and the driver IC 52 in matrix form. The photodetector array 50 consists of K blocks of photodetectors p and each block contains n photodetectors P. Each photodetector P is connected to the drain of the corresponding thin-film transistor T, and the sources of the n thin-film transistors T of one block are connected individually to the driver IC 52. The gates of the thin-film transistors T are connected to gate drive lines $G_1$–$G_K$ on a block basis.

Each photodetector P is a photodiode in which a positive voltage $V_B$ is applied to its cathode to establish a reverse-biased condition. With reflection light from a document surface incident on the photodetector array 50, electron-hole pairs are generated during a storage period and charges are stored in an equivalent capacitance of the photodetector P and an overlap capacitance between the gate and drain of the thin-film transistor T. When a pulse is applied to the gate drive line $G_1$, the thin-film transistors $T_{1,1}$–$T_{1,n}$ turn conductive and charges of n bits on the drain side of those thin-film transistors are transferred to capacitances $C_L$ of the wiring. The charges stored in the capacitances $C_L$ cause potential variations of respective common signal lines 54, which are connected to the driver IC 52. The varied potentials are detected by voltage follower amplifiers of the driver IC 52, and then supplied to an output line 55 in time sequence by an analog multiplexer. The similar operation is repeated thereafter; that is, pulses are applied to the gate drive lines $G_2$–$G_k$ to sequentially turn on the thin-film transistors T on a block basis. As a result, signals of nxK bits are read out in time sequence. Further, the above operation is repeated while the document is moved by a document feeding means (not shown) such as rollers, to obtain an image signal for the entire document. Reference is made to Japanese Patent Application Unexamined Publication No. Sho. 63-9358.

Amorphous silicon (a-Si) is used as the semiconductor material of the thin-film transistors T of the TFT-drive-type image sensor, because a number of thin-film transistors T need to be formed on a substrate of a large area. However, amorphous silicon as the semiconductor material essentially has many traps. Therefore, when the thin-film transistor T operates as a switching device, charges released from the traps flow to the source side during an off state. This is observed as a phenomenon similar to the off leak current.

More specifically, when a pulse is applied to the gate of the thin-film transistor T (see FIG. 7(a)), charges flow between its drain and source during a charge transfer (see FIG. 7(b)). Due to the existence of the traps, charges continue to flow at a large time constant even after the transistor T is turned off. After the charges of the image signal generated in the photodetector P have been transferred to the wiring capacitance $C_L$, the charges released from the traps are also stored in the wiring capacitance $C_L$ irrespective of whether the transferred charges are a light output or a dark output. Therefore, when the potential of the common signal line 54 as changed by the charges stored in the wiring capacitance $C_L$ is read out, unnecessary stored charges of $\Delta q$ are superimposed, as an offset, on the signal, to deteriorate the gradation reproduction performance of the image sensor. Further, since the amount of $\Delta q$ depends on the areas of the source, drain and gate electrodes or the area of the channel region, the dark output varies pixel by pixel.

SUMMARY OF THE INVENTION

An object of the present invention is to provide a TFT-drive-type image sensor which can provide high gradation reproduction performance by elimination of an offset superimposed on an image signal.

According to the invention, a photodetecting device comprises:

a first photodetector for receiving incident light;

a first thin-film transistor for transferring first charges generated in the first photodetector;

a second photodetector shielded from the incident light;

a second thin-film transistor for transferring dark charges generated in the second photodetector; and means for producing output charges corresponding to a difference between the first and dark charges as a response to the incident light.

Further, according to the invention, an image sensor comprises:

a plurality of photodetecting devices having respective first photodetectors arranged in line, each of the photodetecting devices comprising:

the first photodetector for receiving incident light;

a first thin-film transistor for transferring first charges generated in the first photodetector;

a second photodetector shielded from the incident light;

a second thin-film transistor for transferring dark charges generated in the second photodetector; and means for producing output charges corresponding to a difference between the first and second charges as a response to the incident light; and means for detecting the output charges of the respective photodetecting devices in time sequence.

The invention utilizes the fact that after the thin-film transistor is turned off, charges are released from traps in its semiconductor active layer independently of the incident light quantity, i.e., at the same time constant for the first and second thin-film transistors. Therefore, by taking a difference between the charges transferred through the first and second thin-film transistors, only the charges generated in the first photodetector in response to the incident light can be extracted while dark outputs of the first and second thin-film transistors cancel out each other.

DESCRIPTION OF THE PREFERRED EMBODIMENTS

Figure 1:
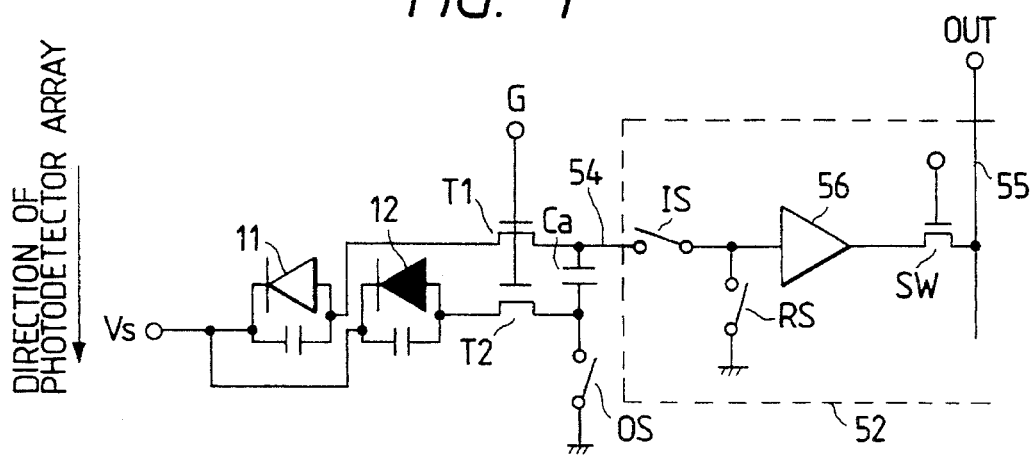
FIG. 1 is an equivalent circuit diagram showing one-pixel constitution of an image sensor according to a first embodiment of the present invention.
Figure 2:
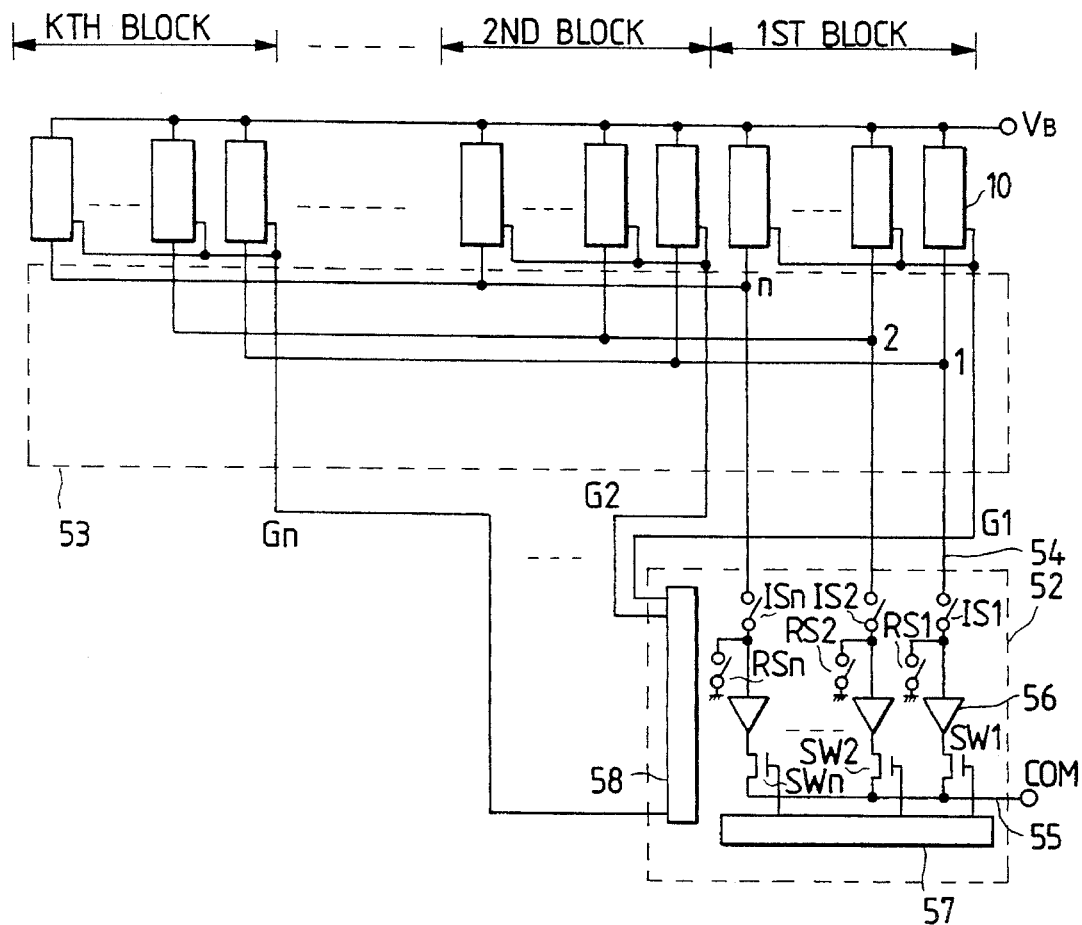
FIG. 2 is an equivalent circuit diagram showing the entire constitution of the image sensor of the first embodiment.
Figure 6:
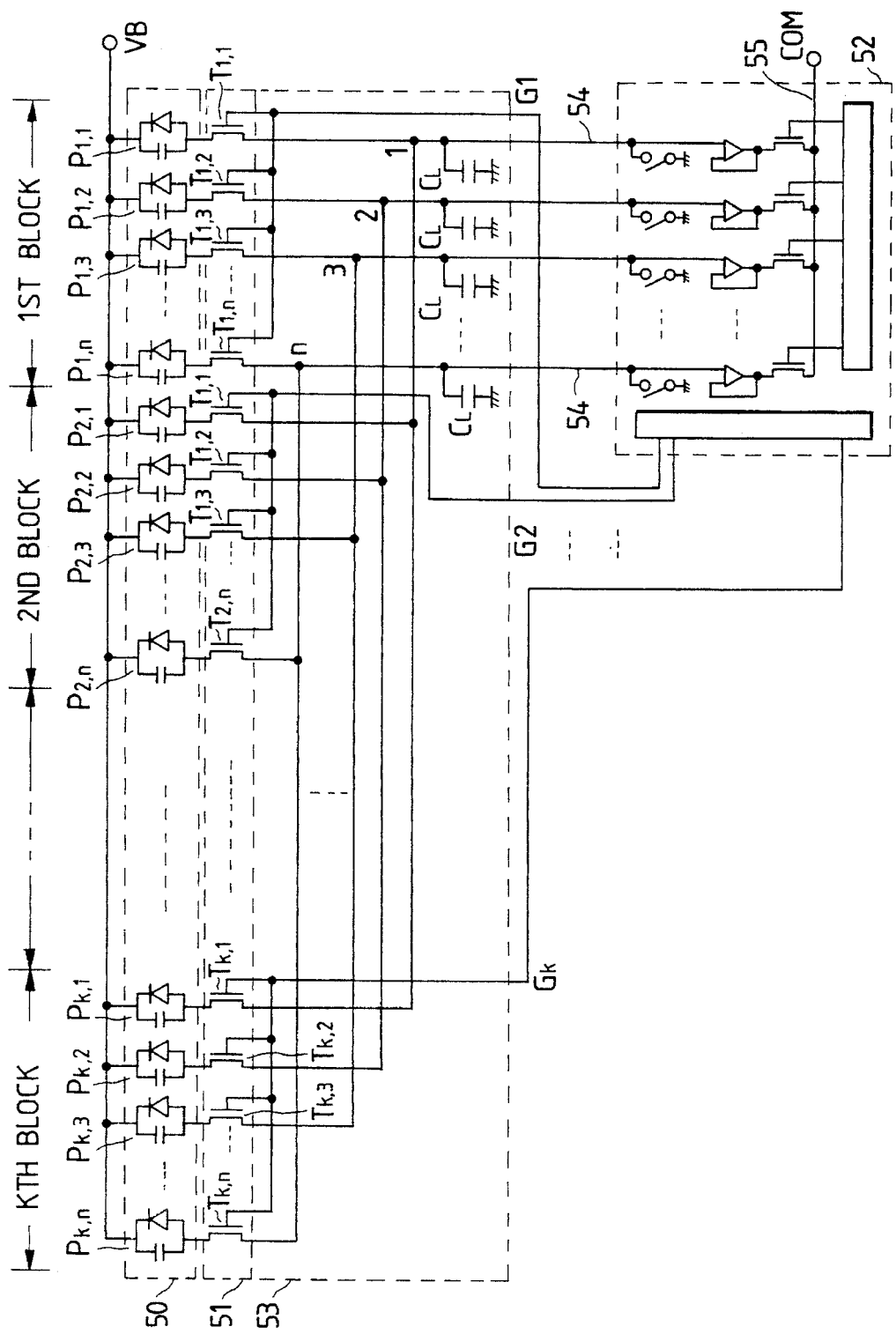
FIG. 6 is an equivalent circuit diagram showing a conventional TFT-drive-type image sensor.

An image sensor according to an embodiment of the present invention will be hereinafter described with reference to FIGS. 1 and 2. FIG. 2 is an equivalent circuit diagram of the image sensor according to the embodiment, and FIG. 1 is an equivalent circuit diagram of a one-pixel portion of the image sensor. In these figures, the parts having the same constitution as the corresponding parts in FIG. 6 are given the same reference symbols.

In the image sensor of the embodiment, one pixel for photoelectrically converting image information to an image signal is constituted of a photodetector unit 10 and n photodetector units 10 form one block. K blocks of photodetector units 10 are arranged in line on an insulating substrate such as a glass plate, to constitute a photodetector array. The photodetector units 10 of the first block are connected to a driver IC 52 via respective common signal lines 54. The photodetector units 10 of the second to Kth blocks are connected to the driver IC 52 via a wiring 53 and the respective common signal lines 54.

In the driver IC 52, each common signal line 54 is connected to a voltage follower amplifier 56 via an input switch IS. The input side of the voltage follower amplifier 56 is grounded via a reset switch RS. The output side of the voltage follower amplifier 56 is connected to an output signal line 55 via an analog switch SW. The analog switches SW are sequentially turned on by a shift register 57 to extract in time sequence the outputs of the voltage follower amplifiers 56 corresponding to the respective pixels of one block.

As shown in FIG. 1, the photodetector unit 10 consists of a photodiode 11, a dark output generating diode 12, thin-film transistors T1 and T2 whose drains are connected to the anodes of the respective diodes 11 and 12, a capacitor Ca connected between the sources of the thin-film transistors T1 and T2, and an output selection switch OS connected between the source of the thin-film transistor T2 and the ground. The cathodes of the photodiode 11 and the dark output generating diode 12 are connected to each other. A positive voltage $V_B$ is applied to the cathodes to make the diodes 11 and 12 in a reverse-biased condition. The associated photodiode 11 and dark output generating diode 12 are arranged on the substrate perpendicularly to the direction of the photodetector array, so that each set of the photodiodes 11 and the dark output generating diodes 12 is arranged in line in the direction of the photodetector array. The source of the thin-film transistor T1 is connected to the common signal line 54.

While the photodiode 11 serves to generate charges in accordance with an input light quantity, the dark output generating diode 12 serves to generate charges that are independent of the input light quantity. The thin-film transistors T1 and T2, which are to transfer the charges stored in the respective diodes 11 and 12 to the capacitor Ca, are connected to a gate drive line G common thereto and controlled by a gate voltage control circuit 58 of the driver IC 52 so as to become conductive on a block-by-block basis. The capacitor Ca serves to store net charges, i.e., charges actually generated by the input light.

For example, the photodiodes 11 have a thin-film sandwich structure constituted by sequentially forming with patterning, on an insulating substrate such as a glass plate, a band-like metal electrode (bottom electrode) of, for instance, chromium, photoconductive layers of amorphous silicon hydride formed discretely, i.e., separately for the respective pixels (photodiodes 11), and transparent electrodes of, for instance, indium tin oxide also formed separately. In addition to the same structure as the photodiodes 11, the dark output generating diodes 12 have, on the light incidence side, a metal film of, for instance, aluminum for light shielding.

The thin-film transistors T1 and T2 have a reverse-staggered structure constituted by forming, on the same substrate on which the photodiodes 11 and the dark output generating diodes 12 are formed, a chromium layer (gate electrode), a silicon nitride ($SiN_x$) film (gate insulating layer), an amorphous silicon (a-Si:H) layer (semiconductor active layer), a silicon nitride film (top insulating layer) opposed to the gate electrode, an $n^+$ amorphous silicon layer (ohmic contact layer), chromium layers (drain and source electrodes) separated from each other, and a polyimide film (insulating layer). The drain and source electrodes are connected to a wiring layer of, for instance, aluminum through contact holes formed in the polyimide film.

Figure 3:
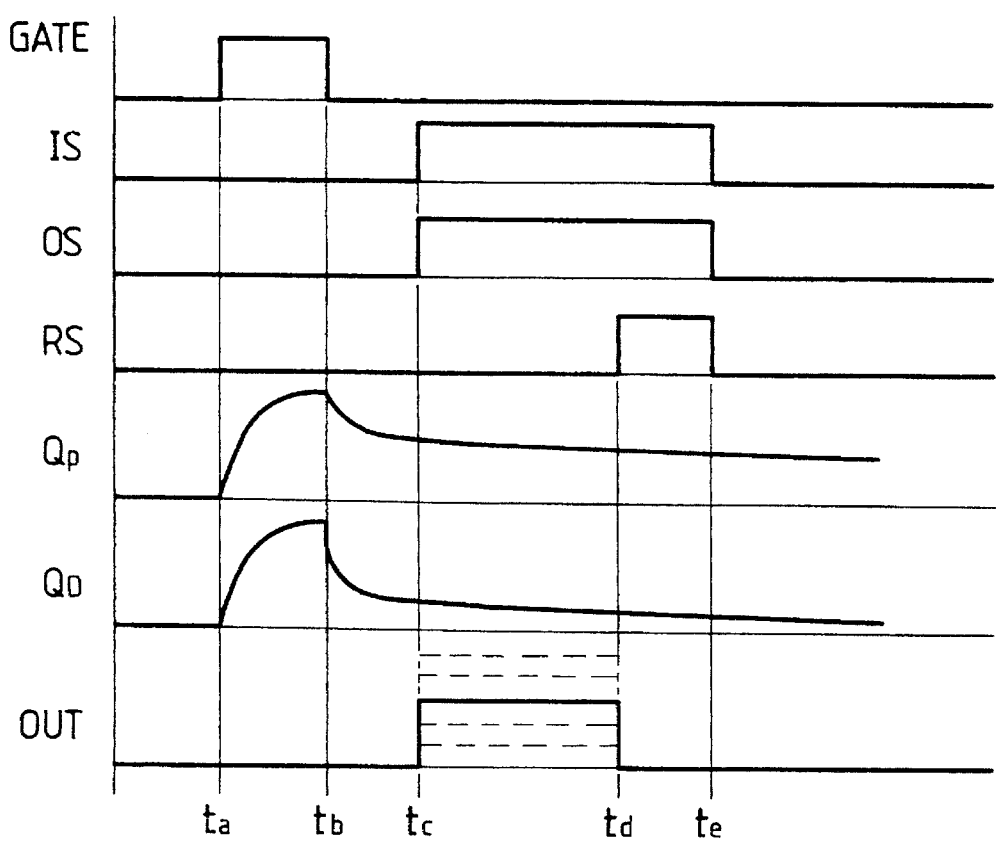
FIG. 3 is a timing chart showing a reading operation of the image sensor of the first embodiment.

Next, a document reading operation of the above image sensor will be described with reference to the one-pixel equivalent circuit diagram of FIG. 1 and a timing chart of FIG. 3.

When light reflected from a document surface is input to the photodetector unit 10 from above, charges are generated photoelectrically in the photodiode 11 in accordance with a received light quantity and stored by a parasitic capacitance of the photodiode 11. On the other hand, in the dark output generating diode 12, no charges are generated photoelectrically because of the metal film formed on the light incidence side but dark charges are generated and stored by a parasitic capacitance like the case of the photodiode 11.

At time $t_a$ when a gate pulse is applied from the gate drive line G to the gates of the thin-film transistors T1 and T2, the thin-film transistors T1 and T2 are turned on to start the charge transfer; that is, the charges stored in the parasitic capacitances of the photodiode 11 and the dark output generating diode 12 are transferred to the respective ends of the capacitor Ca. In FIG. 3, $Q_P$ and $Q_D$ represent the charges flowing through the thin-film transistors T1 and T2, respectively.

At time $t_b$ when the thin-film transistors T1 and T2 are turned off, the operation of storing the charges generated by the light incidence at one terminal of the capacitor Ca and the dark charges at the other terminal of the capacitor Ca is finished.

Figure 7A:
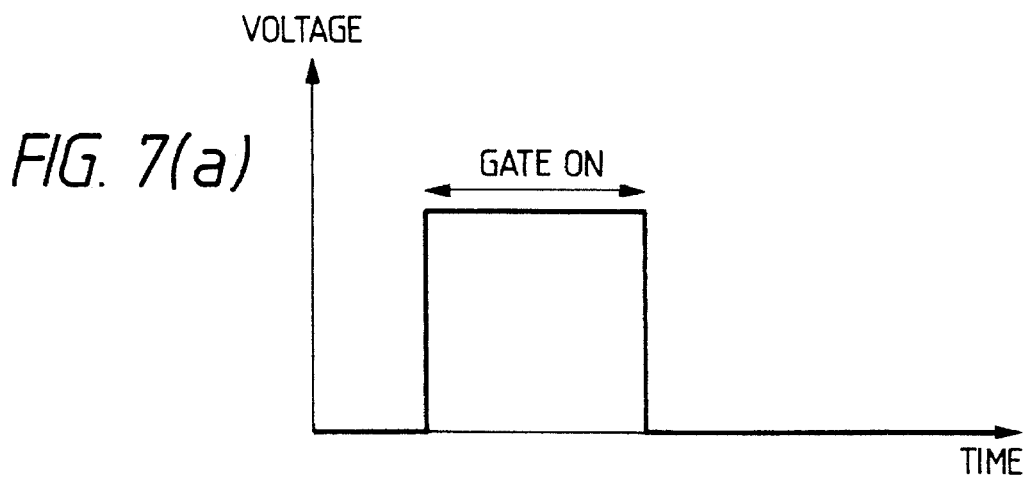
FIGS. 7(a) and 7(b) are waveform diagrams showing how an offset occurs in an output image signal in the conventional image sensor.
Figure 7B:
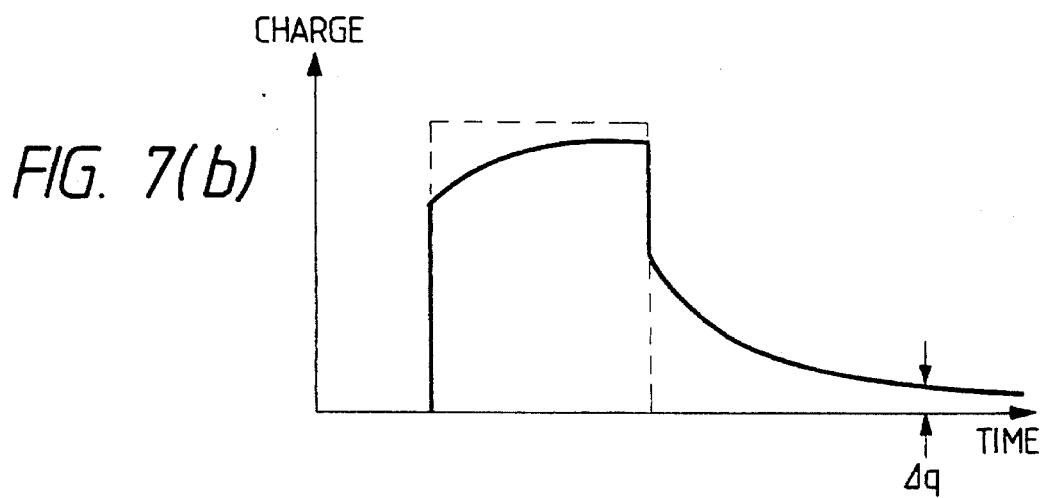

After time $t_b$, the amounts of charges at the capacitor Ca should not change in the ideal case, but they actually change because charges trapped in the amorphous silicon film (semiconductor active layer) of the thin-film transistors T1 and T2 gradually flow out to their source sides. Since, as shown in FIG. 3 ($Q_P$ and $Q_D$) and FIG. 7(b), charges are released from the traps independently of the incident light quantity at the same time constant for the thin-film transistors T1 and T2, the charges at the respective terminals of the capacitor Ca vary at the same rate. Therefore, the net charges stored in the capacitor Ca are always only the charges photoelectrically generated in the photodiode 11 in response to the incident light.

Thereafter, at time $t_c$ when the input switch IS of the driver IC 52 and the output selection switch OS are closed, only the net charges stored in the capacitor Ca are taken out and sent to the common signal line 54 in the form of a voltage with the ground potential as a reference. The potentials of the common signal lines 54 are detected by the voltage follower amplifiers 56 and supplied to the output line 55 in time sequence through the respective analog switches SW. After the signal extraction, at time $t_d$, the reset switches RS are closed to release the charges of the capacitors Ca, to thereby prepare for reading of the next line.

In the above embodiment, the charges generated in accordance with the input light quantity and the charges of the dark output are sent to the two ends of the capacitor Ca through the thin-film transistors T1 and T2, respectively. Therefore, even if the charges trapped in the semiconductor active layers of the thin-film transistors T1 and T2 are released, the net amount of charges stored in the capacitor Ca is not influenced by the charges released from the traps, to enable removal of an offset of the image signal. Since the dark output generating diode 12 is provided for each pixel, the dark output correction can be performed on a pixel-by-pixel basis.

Figure 4:
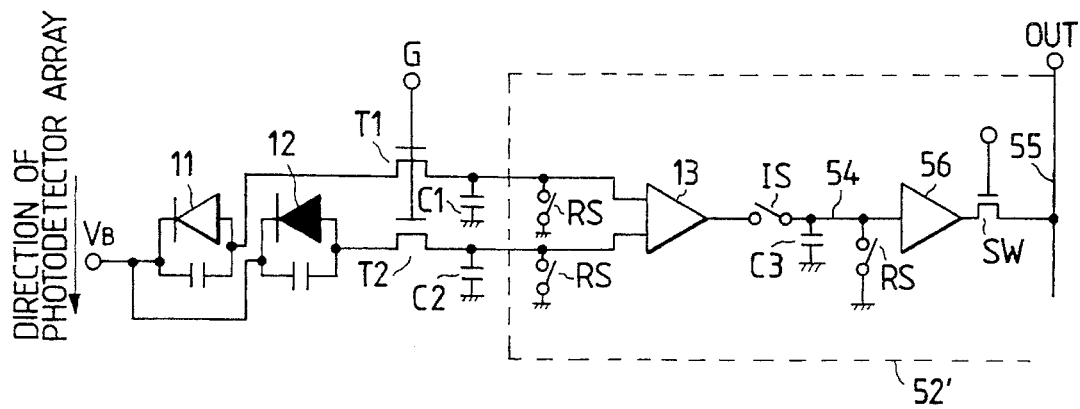
FIG. 4 is an equivalent circuit diagram showing one-pixel constitution of an image sensor according to a second embodiment of the invention.

FIG. 4 shows a one-pixel equivalent circuit of an image sensor according to another embodiment of the invention. In FIG. 4, the parts having the same constitution as the corresponding parts in FIG. 1 are given the same symbols, and the following description is focused on the portion different than the FIG. 1 embodiment.

A capacitor $C_1$ is provided between the ground and the source of a thin-film transistor T1, whose drain is connected to a photodiode 11, and a capacitor $C_2$ is provided between the ground and the source of a thin-film transistor T2, whose drain is connected to a dark output generating diode 12. Reset switches RS are connected in parallel to the capacitors $C_1$ and $C_2$, respectively. The sources of the thin-film transistors T1 and T2 are connected to the inputs of a differential amplifier 13, and the output of the differential amplifier 13 is connected to a voltage follower amplifier 56 via an input switch IS. A parallel connection of a capacitor $C_3$ and a reset switch RS is connected between the input of the voltage follower amplifier 56 and the ground.

Figure 5:
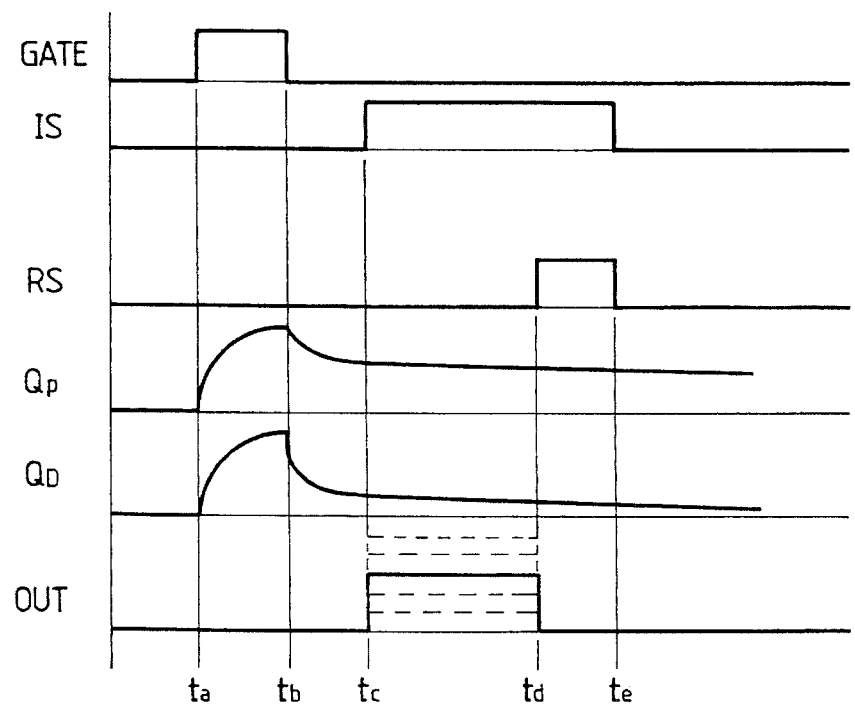
FIG. 5 is a timing chart showing a reading operation of the image sensor of the second embodiment.

Next, a document reading operation of the above image sensor will be described with reference to the one-pixel equivalent circuit diagram of FIG. 4 and a timing chart of FIG. 5.

When light reflected from a document surface is input to the photodetector unit 10 from above, charges are generated photoelectrically in the photodiode 11 in accordance with a received light quantity and stored by a parasitic capacitance of the photodiode 11. On the other hand, in the dark output generating diode 12, no charges are generated photoelectrically because of the metal film formed on the light incidence side but dark charges are generated and stored by a parasitic capacitance like the case of the photodiode 11.

At time $t_a$ when a gate pulse is applied from the gate drive line G to the gates of the thin-film transistors T1 and T2, the thin-film transistors T1 and T2 are turned on to start the charge transfer; that is, the charges stored in the parasitic capacitances of the photodiode 11 and the dark output generating diode 12 are transferred to the respective capacitors $C_1$ and $C_2$. In FIG. 5, $Q_P$ and $Q_D$ represent the charges flowing through the thin-film transistors T1 and T2, respectively.

At time $t_b$ when the thin-film transistors T1 and T2 are turned off, the operation of storing the charges generated by the light incidence by the capacitor $C_1$ and the dark charges by the capacitor $C_2$ is finished.

After time $t_b$, the amounts of charges stored in the capacitors $C_1$ and $C_2$ should not change in the ideal case, but they actually change because charges trapped in the amorphous silicon film (semiconductor active layer) of the thin-film transistors T1 and T2 gradually flow out to their source sides. Since, as shown in FIG. 5 ($Q_P$ and $Q_D$) and FIG. 7(b), charges are released from the traps independently of the incident light quantity at the same time constant for the thin-film transistors T1 and T2, the charges of the respective capacitors $C_1$ and $C_2$ vary at the same rate.

After the input switch IS of a driver IC 52' is closed at time $t_c$, charges of an amount corresponding to the difference between the respective charge amounts of the capacitors $C_1$ and $C_2$ are stored in the capacitor $C_3$, which is connected to the output of the differential amplifier 13. The amount of charges stored in the capacitor $C_3$ always corresponds to only the amount of charges photoelectrically generated by the photodiode 11, and the voltage of a common signal line 54 varies in accordance with the amount of charges stored in the capacitor $C_3$. The voltages of the common signal lines 54 are detected by the voltage follower amplifiers 56, and supplied in time sequence to an output line 55 through analog switches SW. After the signal extraction, at time $t_d$, the respective reset switches RS are closed to release the charges of the capacitors $C_1$–$C_3$, to thereby prepare for reading of the next line.

In the above embodiment, the charges generated in accordance with the input light quantity and the charges of the dark output are stored by the capacitors $C_1$ and $C_2$ through the thin-film transistors T1 and T2, respectively, and the charges corresponding to the difference of the respective charges of those capacitors are in turn stored in the capacitor $C_3$. Therefore, even if the charges trapped in the semiconductor active layers of the thin-film transistors T1 and T2 are released, the amount of charges stored in the capacitor $C_3$ is not influenced by the charges released from the traps, to enable removal of an offset of the image signal. Since the dark output generating diode 12 is provided for each pixel, the dark output correction can be performed on a pixel-by-pixel basis.

As described above, according to the invention, the offset of the image signal due to the dark output can be removed on a pixel-by-pixel basis, so that the gradation reproduction performance of the TFT-drive-type image sensor can be improved.

What is claimed is:

1. A photodetecting device comprising:

a substrate;

a plurality of pixel detectors arranged on the substrate in a first direction, each pixel detector comprising:

a first photodetector disposed perpendicularly to the first direction, for receiving incident light, the first photodetectors of the pixel detectors being arranged in the first direction;

a first thin-film transistor for transferring a first charge generated in the first photodetector;

a second photodetector shielded from the incident light and disposed adjacent to and on the same line as the first photodetector; and a second thin-film transistor for transferring a dark charge generated in the second photodetector; and output charge producing means for receiving the first charge and the dark charge, for generating a difference between the first charge and the dark charge, and for producing an output charge corresponding to the difference between the first and dark charges as a response to the incident light.

2. The photodetecting device of claim 1, wherein the output charges producing means comprises first and second capacitors respectively connected to sources of the first and second thin-film transistors for storing the first and dark charges, a differential amplifier having input terminals respectively connected to the first and second capacitors, and a third capacitor connected to an output terminal of the differential amplifier for storing the output charges.

3. A photodetecting device comprising a plurality of pixel detectors, each pixel detector comprising:

a first photodetector for receiving incident light;

a first thin-film transistor for transferring a first charge generated in the first photodetector;

a second photodetector shielded from the incident light;

a second thin-film transistor for transferring a dark charge generated in the second photodetector; and output charge producing means for receiving the first charge and the dark charge, for generating a difference between the first charge and the dark charge, and for producing an output charge corresponding to the difference between the first and dark charges as a response to the incident light;

wherein the output charge producing means comprises a capacitor connected between respective sources of first and second thin-film transistors.

4. An image sensor comprising:

a substrate;

a plurality of photodetecting devices arranged in line, each of the photodetecting devices comprising a plurality of pixel detectors arranged on the substrate in a first direction, each pixel detector comprising:

a first photodetector disposed perpendicularly to the first direction, for receiving incident light, the first photodetectors of the pixel detectors being arranged in the first direction;

a first thin-film transistor for transferring a first charge generated in the first photodetector;

a second photodetector shielded from the incident light and disposed adjacent to and on the same line as the first photodetector; and a second thin-film transistor for transferring a dark charge generated in the second photodetector; and output charge producing means for receiving the first charge and the dark charge, for generating a difference between the first charge and the dark charge, and for producing an output charge corresponding to the difference between the first and dark charges as a response to the incident light; and means for detecting the output charges of the respective photodetecting devices in time sequence.

5. The image sensor of claim 4, wherein the detecting means detects the output charges of the respective photodetecting devices on a block-by-block basis.

6. The image sensor of claim 4, wherein the output charges producing means of the photodetecting device comprises first and second capacitors respectively connected to sources of the first and second thin-film transistors for storing the first and dark charges, a differential amplifier having input terminals respectively connected to the first and second capacitors, and a third capacitor connected to an output terminal of the differential amplifier for storing the output charges.

7. An image sensor comprising:

a plurality of photodetecting devices arranged in line, each of the photodetecting devices comprising a plurality of pixel detectors, each pixel detector comprising:

a first photodetector for receiving incident light;

a first thin-film transistor for transferring a first charge generated in the first photodetector;

a second photodetector shielded from the incident light;

a second thin-film transistor for transferring a dark charge generated in the second photodetector; and output charge producing means for receiving the first charge and the dark charge, for generating a difference between the first charge and the dark charge, and for producing an output charge corresponding to the difference between the first and dark charges as a response to the incident light; and means for detecting the output charges of the respective photodetecting devices in time sequence;

wherein the output charge producing means of the photodetecting device comprises a capacitor connected between respective sources of the first and second thin-film transistors.

\* \* \* \* \*